United States Patent [19]

Thomas et al.

[11] Patent Number: 4,946,872
[45] Date of Patent: Aug. 7, 1990

[54] POLYISOCYANATE PREPOLYMERS PREPARED FROM RIGID POLYAROMATIC PRECURSOR MATERIALS, AND POLYURETHANES PREPARED THEREFROM

[75] Inventors: Oomman P. Thomas, Lake Jackson; Earl E. Burt, III, Clute; Richard D. Peffley, Lake Jackson, all of Tex.

[73] Assignee: The Dow Chemical Company, Midland, Mich.

[21] Appl. No.: 330,537

[22] Filed: Mar. 30, 1989

Related U.S. Application Data

[63] Continuation of Ser. No. 73,046, Jul. 14, 1987, abandoned.

[51] Int. Cl.$^5$ .................. C08G 18/10; C08G 18/72
[52] U.S. Cl. .................. 521/159; 521/164; 521/167; 521/170; 521/174; 528/59; 528/61; 528/65; 528/66; 528/76; 528/85

[58] Field of Search .............. 528/79, 78, 88, 85, 528/61, 66, 59, 65, 76; 521/159, 164, 167, 170, 174

[56] References Cited

U.S. PATENT DOCUMENTS

| | | | |
|---|---|---|---|
| 3,078,257 | 2/1963 | Rinke et al. | 528/79 |
| 3,681,290 | 8/1972 | Meckel et al. | 528/61 |
| 4,182,830 | 1/1980 | Ford, Jr. | 528/79 |
| 4,289,682 | 9/1981 | Peters | 528/80 |

*Primary Examiner*—John Kight, III
*Assistant Examiner*—Dennis R. Daley

[57] ABSTRACT

A liquid prepolymer composition is disclosed which contains free isocyanate groups which is the reaction product of a stoichiometric excess of a polyisocyanate and an active hydrogen-containing compound which contains an internal rigid polyaromatic grouping. Polyurethane and/or polyurea polymers made from these prepolymer compositions are also disclosed.

9 Claims, No Drawings

4,946,872

POLYISOCYANATE PREPOLYMERS PREPARED FROM RIGID POLYAROMATIC PRECURSOR MATERIALS, AND POLYURETHANES PREPARED THEREFROM

This is a continuation of application Ser. No. 073,046, filed Jul. 14, 1987, now abandoned.

BACKGROUND OF THE INVENTION

This invention relates to polyisocyanate prepolymers or quasi-prepolymers, and to polyurethane and/or polyurea polymers made therefrom.

Polyurethanes, polyureas and similar polymers are commercially prepared by reacting an active hydrogen-containing composition with a polyisocyanate. By varying the characteristics of the polyisocyanate and the active hydrogen-containing composition, polymers having widely varying properties can be prepared. For example, by using relatively low equivalent weight, high functionality precursor materials, rigid polyurethanes are prepared. Conversely, flexible polyurethanes are prepared by using relatively high equivalent weight, low functionality precursor materials. By using or omitting blowing agents, cellular or noncellular polyurethanes are prepared. Accordingly, polyurethanes can be prepared which are useful in a wide variety of applications.

It is common practice to reinforce the polyurethane to give it better properties. For example, in preparing flexible polyurethane foams, it is known to employ dispersions of reinforcing polymer particles in a polyether polyol in order to obtain higher load-bearing and good cell opening. Similarly, the use of reinforcing fibers and fillers is common in noncellular polyurethanes as well.

Due to the high cost of the reinforcing agents, and the processing difficulties imposed by their use, it is desirable to use the smallest amount thereof which provides adequate reinforcement, or even avoid their use altogether. In addition, it is always desirable to further improve the properties of polyurethanes.

It would therefore be desirable to provide a polyurethane and/or polyurea polymer having improved physical properties. It would also be desirable to provide a precursor material which, when reacted to form a polyurethane and/or polyurea polymer, provides improved properties, especially load bearing and/or tensile properties.

SUMMARY OF THE INVENTION

In one aspect, this invention is a liquid prepolymer composition containing free isocyanate groups which is the reaction product of a stoichiometric excess of a polyisocyanate and an active hydrogen-containing compound which contains an internal rigid polyaromatic grouping.

In another aspect, this invention is a polyurethane and/or polyurea polymer prepared in the reaction of an active hydrogen-containing composition with a liquid prepolymer composition containing free isocyanate groups which comprises the reaction product of a stoichiometric excess of a polyisocyanate with an polyaromatic active hydrogen-containing compound which contains an internal rigid polyaromatic grouping.

The applicants have found that the use of a prepolymer composition of this invention to prepare a polyurethane or polyurea provides substantially improved physical properties, particularly load-bearing and/or tensile properties in flexible polyurethane foam.

DETAILED DESCRIPTION OF THE INVENTION

In this invention, a polyisocyanate-terminated prepolymer composition is used to prepare a polyurethane or polyurea polymer. The prepolymer composition is the reaction product of a stoichiometric excess of a polyisocyanate and an active hydrogen-containing compound which contains an internal rigid polyaromatic grouping (hereinafter "rigid precursor"). The internal rigid polyaromatic grouping advantageously has an aspect ratio of at least 2.4. Preferably, the internal rigid polyaromatic grouping has an aspect ratio of at least about 6.4 or can aggregate with other like groups to form a nematic, twisted nematic (cholesteric), or smectic ordering (i.e., is liquid crystalline).

The rigid precursor compounds used herein are polyphenylene compounds which are soluble in a polyisocyanate. These polyphenylene compounds are advantageously as represented by the structure 1

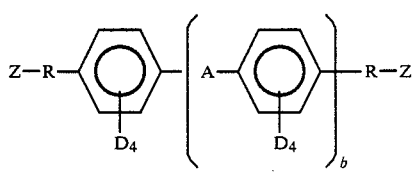

wherein each D is independently an inert substituent group which, when ortho to the—A—linkage, can form a cyclic structure with the—A—linkage and the aromatic rings, b is a number from about 1 to about 10, preferably about 1-3, more preferably about 1-2, each Z is independently an active hydrogen-containing group, preferably hydroxyl, primary amine or secondary amine, each R is independently a divalent radical which is inert to the reaction of the isocyanate-reactive polyphenylene compound with a polyisocyanate, and A is a covalent bond, a cycloaliphatic diradical, —CH$_2$CH$_2$— or a rigid linking group, or forms a cyclic structure with the aromatic rings and the groups D ortho to the—A—linkage. Preferably, each R is an oxyalkylene or polyoxyalkylene diradical. More preferably, each R is a oxypropylene, polyoxypropylene, oxyethylene or polyoxyethylene diradical. Most preferably, each R is an oxyalkylene polyoxyalkylene group containing from about 1 to about 4 repeating oxyethylene or oxypropylene units. Suitable groups A include a covalent bond, a cycloaliphatic group,

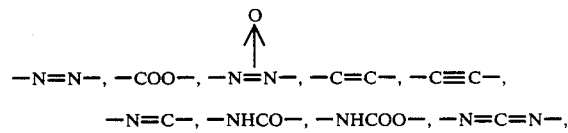

a heterocyclic group and the like. In describing the groups D as inert, it is meant that the groups D do not undesirably react with the polyisocyanate, undesirably interfere with the reaction of the polyisocyanate with an active hydrogen-containing compound, or destroy the rigid character of the rigid precursor compound. Exemplary such groups D include hydrogen, inertly substituted lower alkyl or halogen. Most preferably, the groups D are selected such that the rigid precursor compound is symmetrical. The groups D which are ortho to the—A—linkage can form, together with the—A—linkage, a cyclic structure, particularly a $C_5$-$C_6$ cycloaliphatic structure. Examples of such rigid precursor compounds include adducts of biphenol with from about 2 to about 10 moles of propylene oxide and/or ethylene oxide, adducts of 3,5,3',5'-tetramethylbiphenol with from about 2 to about 10 moles of propylene oxide and/or ethylene oxide, adducts of 3,5,3',5'-tetrahalobiphenol with from about 2 to about 10 moles of propylene oxide and/or ethylene oxide, and the like.

The rigid precursor compound can be reacted with a polyisocyanate to form an isocyanate-terminated prepolymer containing an internal rigid moiety. This is advantageously accomplished by combining a stoichiometric excess of the polyisocyanate with the rigid precursor compound. Advantageously, about 1 to about 50, preferably about 5 to about 40, more preferably about 5 to about 25 parts by weight of the rigid precursor compound are combined with 100 parts by weight of the polyisocyanate and caused to react until all of the active hydrogen-containing groups in the rigid precursor compound have reacted. The resulting prepolymer product is a solution or colloidal dispersion of the prepolymer in the polyisocyanate. In making this prepolymer, it is preferred to use a substantially difunctional polyisocyanate, although higher functionality polyisocyanates may also be used.

In reacting the rigid precursor compound with the polyisocyanate, it may be desired to heat the mixture slightly, or to use a catalyst to speed the reaction. This is particularly true when the rigid precursor compound is hydroxyl-terminated. Mild temperatures, such as about 30°-100° C., are usually sufficient. Suitable catalysts include the usual urethane catalysts, including tertiary amine and organometallic catalysts described below.

The polyisocyanate used herein is any which has properties suitable for preparing the desired polyurethane. These polyisocyanates include those having aromatically bound isocyanate groups as well as those which contain isocyanate groups bound to aliphatic carbon atoms. In general, aromatic polyisocyanates are preferred over the aliphatic polyisocyanates, as the rigid precursor materials and reaction products thereof with the polyisocyanate are generally more soluble in the aromatic polyisocyanates.

Aromatic polyisocyanates which are particularly useful herein include 2,4- and/or 2,6- toluene diisocyanate, diphenylmethanediisocyanate, p-phenylene diisocyanate, polymethylenepolyphenylpolyisocyanates, mixtures thereof and the like. Also useful are polymeric derivatives of diphenylmethanediisocyanate as well as prepolymers or quasi-prepolymers thereof.

Particularly useful aliphatic polyisocyanates include, for example, the hydrogenated derivatives of the foregoing aromatic polyisocyanates, as well as hexamethylene diisocyanate, isophoronediisocyanate, 1,4-cyclohexane diisocyanate and the like.

In addition, prepolymers and quasi-prepolymers of the foregoing polyisocyanates having an —NCO content of about 0.5 to about 30% by weight are useful herein.

A polyurethane is prepared from the polyisocyanate composition of this invention by reacting it with at least one active hydrogen-containing compound. The polyisocyanate is advantageously present in an amount sufficient to provide in the reaction mixture from about 70 to about 500, preferably about 80 to about 150, and more preferably about 95 to about 120 isocyanate groups per 100 active hydrogen-containing groups. Higher amounts of the polyisocyanate can be used when the formation of an isocyanurate-containing polymer is desired.

In general, noncellular polyurethane and/or polyurea elastomers (those having an unfilled density of at least about 0.8 g/cc) are prepared by reacting a relatively high equivalent weight active hydrogen-containing compound (preferably 800–3000 molecular weight) and a chain extender compound with a polyisocyanate. The chain extender compound advantageously has an equivalent weight of from about 31–250 and a functionality of about 2 to about 4, preferably about 2. The chain extender is preferably a glycol or a diamine, with $C_2$-$C_6$ alkylene glycols and stearically hindered aromatic diamines being preferred. In preparing noncellular or microcellular elastomers, a conventional casting process, particularly a solventless casting process, or a reaction injection molding process can be employed. Suitable casting techniques are described, for example, in U.S. Pat. No. 4,556,703. Reaction injection molding techniques are described, for example, in Sweeney, F. M., *Introduction to Reaction Injection Molding*, Technomics, Inc., 1979, incorporated by reference. Suitable formulations for use in RIM processes are described, for example, in U.S. Pat. Nos. 4,269,945, 4,218,610, 4,297,444, 4,530,941, all incorporated by reference. In these formulations substitution of all or a portion of one or more of the active hydrogen-containing compounds with a liquid crystalline polyol or a liquid crystal dispersion having a similar equivalent weight functionality and reactivity is made.

In preparing elastomeric polyurethane and/or polyurea polymers, either a one-shot or two-shot (i.e. prepolymer) process can be employed. In the two-shot process, all or most of the relatively high equivalent weight active hydrogen-containing compound is reacted with an excess of a polyisocyanate to form an isocyanate-terminated prepolymer, which is then reacted with the chain extender and any remaining high equivalent weight material. In the one-shot process, most or all of the relatively high equivalent weight material is mixed with the chain extender and the mixture is reacted with the polyisocyanate. However, certain prepolymers and quasi-prepolymers may be employed as the polyisocyanate component even in a one-shot process. Preferably, the polyurethane and/or polyurea polymer is cellular, i.e. has an unfilled density of less than about 0.8 g/cc. More preferably, the polyurethane and/or polyurea is a flexible polyurethane foam. Such flexible polyurethane foam is advantageously prepared by reacting a relatively high equivalent weight polyol with the polyisocyanate composition of this invention in the presence of a blowing agent. In preparing flexible polyurethane foams, it is advantageous to also employ a surfactant to stabilize the foaming reaction mass and to compatibilize the various components of the reaction mixture, and to employ various catalysts for both the urethane forming and blowing reactions. In addition, a crosslinker such as diethanolamine is often employed to promote rapid initial curing.

In preparing flexible polyurethane foam, the major component of the active hydrogen-containing compound(s) used advantageously has an equivalent weight of about 800–3000 and an average functionality (defined herein as the number of active hydrogen-containing groups per molecule) from about 2 to about 4, more preferably about 2–3.

Suitable blowing agents for preparing foams are well known and include, for example, water, low boiling halogenated alkanes such as methylene chloride, monochlorodifluoromethane, dichlorodifluoromethane, dichloromonofluoromethane and the like, the so-called "azo" blowing agents, finely divided solids and the like as well as other materials which generate a gas under the conditions of the foaming reaction. Water, the halogenated methanes or mixtures thereof are preferred. When water is used as the blowing agent, about 0.5 to about 10, preferably about 1 to about 5 parts by weight are used per 100 parts of active hydrogen-containing compound(s). The halogenated alkanes are typically used in an amount from about 5 to about 75 parts per 100 parts by weight of active hydrogen-containing compound(s). However, the use of varying amounts of blowing agents to achieve a desired density is well known in the art, and it may in some instances be advantageous to use amount of blowing agents outside of the ranges mentioned before.

Suitable surfactants include the diverse silicone surfactants, preferably those which are block copolymers of a polysiloxane and a poly(alkylene oxide). Suitable such surfactants include Y-10184 surfactant, available from Union Carbide Corporation, and the like. Surfactants are used in an amount sufficient to stabilize the foaming reaction mixture against collapse until the foam is cured, and to promote the formation of a somewhat uniform cell structure. Typically, about 0.1 to about 5, preferably about 0.3 to about 3 parts by weight of surfactant are employed per 100 parts of active hydrogen-containing compound(s).

Crosslinkers which are commonly employed in preparing flexible polyurethane foams include low equivalent weight alkanolamines such as ethanolamine, diethanolamine, triethanolamine, propanolamine, dipropanolamine, tripropanolamine, methyldiethanol amine, methyl dipropanol amine, and the like. Also useful are the alkylene glycols and low equivalent weight hydroxyl-terminated polyols such as glycerine and trimethylol propane. Such crosslinkers are generally used in minor amounts, preferably about 0.2 to about 10, more preferably about 0.5–5 parts per 100 parts of relatively high equivalent weight active hydrogen-containing compounds. Catalysts for preparing polyurethane and/or polyurea foams include organometallic catalysts and tertiary amine compounds. Of the organometallic catalysts, organotin catalysts are generally preferred. Suitable catalysts are described, for example, in U.S. Pat. No. 4,495,081, incorporated herein by reference. When using such catalysts, an amount sufficient to increase the rate of the urethane-forming (and foaming reactions, when a cellular polymer is formed) is used. Typically, about 0.001 to about 0.5 part of an organometallic catalyst is used per 100 parts of active hydrogen-containing compound(s). Tertiary amine-containing compounds are used in amounts ranging from about 0.1 to about 3 parts per 100 parts of active hydrogen-containing material. When polyisocyanurate foams are produced, alkali metal compounds are useful trimerization catalysts.

The foam can be prepared in any convenient manner. The foam can be prepared by reacting the components in a closed mold, or by permitting the reacting components to freely rise. Processes for preparing polyurethane foams are described, for example, in U.S. Pat. No. 4,451,588, incorporated by reference.

In addition to preparing flexible foams and noncellular elastomers, the polyisocyanate composition of this invention is useful in preparing rigid cellular and noncellular polyurethane and/or polyurea polymers. Methods for making such materials are described, for example, in U.S. Pat. Nos. 4,579,844 and 4,569,951, incorporated herein by reference. Rigid polyurethane foams are advantageously prepared using a active hydrogen-containing compounds having an equivalent weight from about 31–400 and an average functionality of about 3–16, preferably about 3 to about 8. The polyurethane and/or polyurea polymers of this invention are useful, for example, as seating, cushioning, industrial elastomers, automobile fascia and bumpers, thermal insulation and the like.

The following examples are provided to illustrate the invention, but are not intended to limit the scope thereof. All parts and percentages are by weight unless otherwise indicated.

EXAMPLE 1

A TDI prepolymer is prepared by adding to 100 parts TDI 10 parts of a rigid monomer having the structure

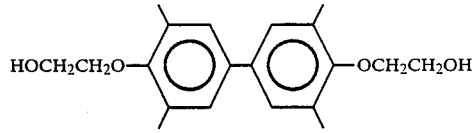

and heating mildly until all of the hydroxyl groups have reacted. The resulting prepolymer is clear, indicating that the reaction product of this monomer and TDI is soluble in TDI. This prepolymer is then used as the sole polyisocyanate in the formation of a molded polyurethane foam (Sample No. 2). The foam is prepared by reacting the prepolymer at a 103 index with an active hydrogen-containing composition having a composition as indicated in Table 1 following.

TABLE 1

| Component | Parts by Weight |
|---|---|
| Polyol A[1] | 60 |
| Copolymer Polyol A[2] | 40 |
| Water | 3.8 |
| Silicone Surfactant[3] | 1.6 cc |
| Catalyst A[4] | 0.3 cc |
| Diethanolamine | 1.7 cc |
| Tertiary Amine Catalyst[5] | 0.1 cc |
| dimethyltindiaurate | 0.005 cc |

[1] A 4800 molecular weight ethylene oxide-capped poly(propylene oxide triol).
[2] See note 1 of Table 1.
[3] DC-5043, available from Dow Corning Corporation.
[4] A 33 weight percent solution of triethylenediamine in dipropylene glycol.
[5] bis(N,N-dimethylaminoethyl)amine.

The resulting foam Sample No. 1 contains about 3.27 wt.-% of the rigid monomer and has properties as indicated in Table 2 following.

An additional foam is made in like manner, except the prepolymer is prepared using one-half the amount of the rigid monomer (Sample No. 2). Its properties are as indicated in Table 2. For comparison, a foam (Comparative Sample No. A) is made using unmodified TDI as the polyisocyanate. Its properties are also as indicated in Table 2.

TABLE 2

| Sample No. | 1 | 2 | A* |
|---|---|---|---|
| Density, lb/ft³ | 2.05 | 1.96 | 1.95 |
| Tensile Strength, psi[1] | 25 | 21.8 | 18 |
| Elongation, %[1] | 145 | 124 | 134 |
| Tear Strength, pli[2] | 2.18 | 1.56 | 1.54 |
| Resiliency, %(DB)[3] | 45 | 47 | 55 |
| ILD[4] | | | |
| 25% | 27 | 22 | 20 |
| 65% | 74 | 60 | 54 |
| return to 25% | 20 | 17 | 16 |
| % Hysteresis return[5] | 75 | 79 | 82 |
| Modulus[6] | 2.74 | 2.70 | 2.79 |
| Air Flow[7] | 2.3 | 2.1 | 3.1 |

*Not an example of this invention.
[1-5,7] ASTM 3574-81
[6] Ratio of 65% ILD to 25% ILD The data in Table 2 shows that significant improvements in load bearing, tear strength and tensile strength are achieved. In Sample No. 1, a substantial improvement in both tensile and elongation are obtained. Other properties are also very good.

EXAMPLE 2

Three TDI prepolymers (Sample Nos. 3-5) are prepared according to the procedure described in Example 1 by reacting 100 parts by weight TDI with 10 parts of rigid monomers represented by the structures:

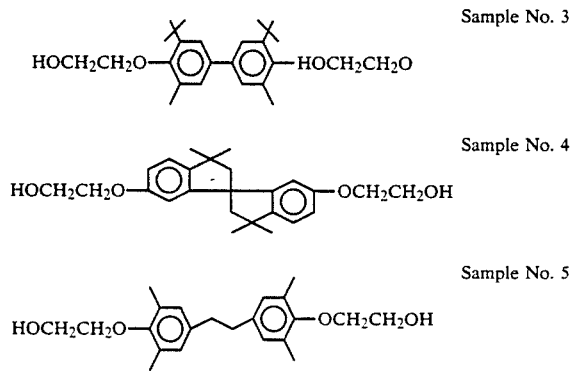

Polyurethane foams are prepared from each of these prepolymers according to the procedure described in Example 1. The foams have properties as indicated in Table 3 following. For comparison, a foam is prepared using unmodified TDI as the polyisocyanate (Comparative Sample B). Its properties are indicated in Table 3. Substantial improvement in load bearing, tear strength and tensile strength are seen with this invention.

TABLE 3

| Sample No. | 3 | 4 | 5 | B* |
|---|---|---|---|---|
| Density, lb/ft³ | 2.25 | 2.19 | 2.24 | 2.15 |
| Tensile Strength, psi[1] | 29.4 | 27.7 | 27.2 | 22.6 |
| Elongation, %[1] | 120 | 120 | 116 | 122 |
| Tear Strength, pli[2] | 2.36 | 2.19 | 2.20 | 1.60 |
| Resiliency, %(DB)[3] | 40 | 40 | 42 | 55 |
| ILD[4] | | | | |
| 25% | 39 | 32 | 35 | 23 |
| 65% | 108 | 89 | 97 | 66 |
| return to 25% | 24 | 22 | 23 | 18 |
| % Hysteresis return[5] | 63 | 67 | 67 | 77 |
| Modulus[6] | 2.77 | 2.78 | 2.77 | 2.87 |
| Air Flow[7] | 1.1 | 1.3 | 1.2 | 2.0 |

*Not an example of this invention.
[1-7] Same as notes [1-7] in Table 2.

EXAMPLE 3

A TDI prepolymer Sample No. 6 is prepared according to the procedure described in Example 1 by reacting 100 parts by weight TDI with 10 parts of a rigid monomer represented by the structure:

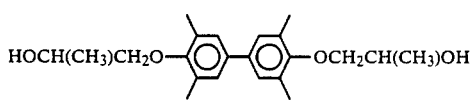

The prepolymer is used to prepare a polyurethane foam according to the procedure described in Example 1. The foam has properties as indicated in Table 4 following. For comparison, a foam is prepared using unmodified TDI as the polyisocyanate (Comparative Sample C). Its properties are indicated in Table 4. Substantial improvement in load bearing and tensile strength are seen with this invention.

TABLE 4

| Sample No. | 6 | C* |
|---|---|---|
| Density, lb/ft³ | 2.3 | 2.11 |
| Tensile Strength, psi[1] | 28.5 | 21.7 |
| Elongation, %[1] | 117 | 117 |
| Tear Strength, pli[2] | 2.10 | 2.10 |
| Resiliency, %(DB)[3] | 42 | 51 |
| ILD[4] | | |
| 25% | 38 | 24 |
| 65% | 113 | 71 |
| return to 25% | 25 | 19 |
| % Hysteresis return[5] | 66 | 79 |
| Modulus[6] | 2.97 | 2.96 |
| Air Flow[7] | 1.3 | 1.8 |

*Not an example of this invention.
[1-7] Same as notes [1-7] in Table 2.

What is claimed is:

1. A polyurethane and/or polyurea polymer prepared in the reaction of an active hydrogen-containing composition with a liquid prepolymer composition containing free isocyanate groups which comprises the reaction product of a stoichiometric excess of a polyisocyanate and an polyaromatic active hydrogen-containing compound which is represented by the structure

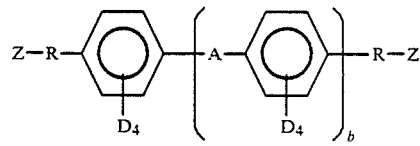

wherein each D is independently an inert substituent group which, when ortho to the—A—linkage, can form a cyclic structure with the—A—linkage and the aromatic rings, b is a number from about 1 to about 10, each z is independently an active hydrogen-containing group, each R is independently a divalent radical which is inert to the reaction of the isocyanate-reactive polyphenylene compound with a polyisocyanate, and A is a covalent bond or a rigid linking group, or forms a cyclic structure with the aromatic rings and the groups D ortho to the—A—linkage.

2. The polyurethane and/or polyurea polymer of claim 1 wherein each D is hydrogen, lower alkyl or halogen, b is a number from about 1 to about 2, each Z is a hydroxyl, primary amine or secondary amine group, and each R is an oxyalkylene or polyoxyalkylene diradical.

3. The polyurethane and/or polyurea polymer of claim 2 wherein said active hydrogen-containing composition comprises a relatively high equivalent weight active hydrogen-containing compound and a chain extender compound having a functionality of about 2 to about 4.

4. The polyurethane and/or polyurea polymer of claim 3 which is a noncellular or microcellular polymer.

5. The polyurethane and/or polyurea polymer of claim 4 wherein the relatively high equivalent weight active hydrogen-containing compound comprises a hydroxyl or primary or secondary amine-terminated polyether and the polyisocyanate is an aromatic polyisocyanate.

6. The polyurethane and/or polyurea polymer of claim 2 wherein said active hydrogen-containing composition comprises a relatively high equivalent weight active hydrogen-containing compound and a blowing agent.

7. The polyurethane and/or polyurea polymer of claim 6 wherein the relatively high equivalent weight active hydrogen-containing compound comprises a hydroxyl or primary or secondary amine-terminated polyether and the polyisocyanate is an aromatic polyisocyanate.

8. The polyurethane and/or polyurea polymer of claim 7 which is a flexible foam.

9. The polyurethane and/or polyurea polymer of claim 2 which is a rigid foam.

* * * * *